(12) United States Patent
Lis et al.

(10) Patent No.: US 10,292,021 B2
(45) Date of Patent: May 14, 2019

(54) SUB-GROUP COMMUNICATION IN A DIRECT MODE OF OPERATION

(71) Applicant: MOTOROLA SOLUTIONS, INC., Chicago, IL (US)

(72) Inventors: Sebastian Lis, Słomniki (PL); Sylwester Baranski, Kraków (PL); Mariusz Wawrowski, Wawrzenczyce (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 15/560,981

(22) PCT Filed: Apr. 14, 2015

(86) PCT No.: PCT/PL2015/050008
§ 371 (c)(1),
(2) Date: Sep. 22, 2017

(87) PCT Pub. No.: WO2016/167676
PCT Pub. Date: Oct. 20, 2016

(65) Prior Publication Data
US 2018/0054719 A1 Feb. 22, 2018

(51) Int. Cl.
*H04W 4/10* (2009.01)
*H04W 52/28* (2009.01)
(Continued)

(52) U.S. Cl.
CPC ......... *H04W 4/10* (2013.01); *H04M 1/72563* (2013.01); *H04W 52/245* (2013.01); *H04W 52/288* (2013.01); *H04W 52/383* (2013.01)

(58) Field of Classification Search
None
See application file for complete search history.

(56) References Cited

U.S. PATENT DOCUMENTS

| 7,668,127 B2 | 2/2010 | Krishnamurthy et al. |
| 7,983,230 B1 | 7/2011 | Li et al. |

(Continued)

FOREIGN PATENT DOCUMENTS

| WO | 2013/180942 | 12/2013 |
| WO | 2014/071308 | 5/2014 |

OTHER PUBLICATIONS

GB1715294.3 Examination Report dated Nov. 14, 2017 (2 pages).
(Continued)

*Primary Examiner* — Fayyaz Alam
(74) *Attorney, Agent, or Firm* — Michael Best & Friedrich LLP

(57) ABSTRACT

Sub-group communication during a direct mode of operation of mobile stations in a mobile communication network. A controller in a mobile station detects a request to transmit an outgoing communication and determines whether a push-to-talk key is in an activated state or in a deactivated state. The controller further selects a first power level when a determined state of the push-to-talk key is the activated state, and selects a second power level when the determined state of the push-to-talk key is the deactivated state. The controller also transmits, via the radio unit, the outgoing communication on a current operating channel to at least one other mobile station within a mobile communication network at the selected power level.

21 Claims, 8 Drawing Sheets

(51) Int. Cl.
*H04W 52/38* (2009.01)
*H04M 1/725* (2006.01)
*H04W 52/24* (2009.01)

(56) References Cited

U.S. PATENT DOCUMENTS

| | | | |
|---|---|---|---|
| 9,750,059 B2 | 8/2017 | Swierczynski et al. | |
| 2005/0239404 A1* | 10/2005 | Karabinis | H04B 7/18563 455/12.1 |
| 2008/0171567 A1* | 7/2008 | Kossi | H04W 88/04 455/518 |
| 2016/0135230 A1 | 5/2016 | Swierczynski et al. | |

OTHER PUBLICATIONS

Sepura, "Gateway Product Presentation," power point presentation (2008) pp. 1-55, ftp://ftp.gov.bm/telecomrfp/R&S/R&S/Binder%201%20&%202/Technical%20Part%204/File%201.pdf.

PCT/PL2015/050008 International Search Report and Written Opinion of the International Searching Authority dated Aug. 28, 2015 (10 pages).

* cited by examiner

FIG. 1  -PRIOR ART-

SUB-GROUP COMMUNICATION IN A DIRECT MODE OF OPERATION

BACKGROUND OF THE INVENTION

TETRA (Terrestrial Trunked Radio) (formerly known as Trans-European Trunked Radio) communication networks and other communications networks generally provide for a trunked mode of operation and a direct mode of operation for communication between mobile stations. In current implementations of such communication networks, every mobile station receives every communication transmitted on its current channel which it is capable to detect, regardless of whether the communication is intended for that particular mobile station. While receiving an unwanted (or "alien") communication, a mobile station is inhibited from receiving and/or transmitting other communications. Further, the mobile station radio transmitting the unwanted communication is unaware that it is blocking the channel.

Accordingly, there is a need for methods and devices of sub-group communication in a direct mode of operation.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
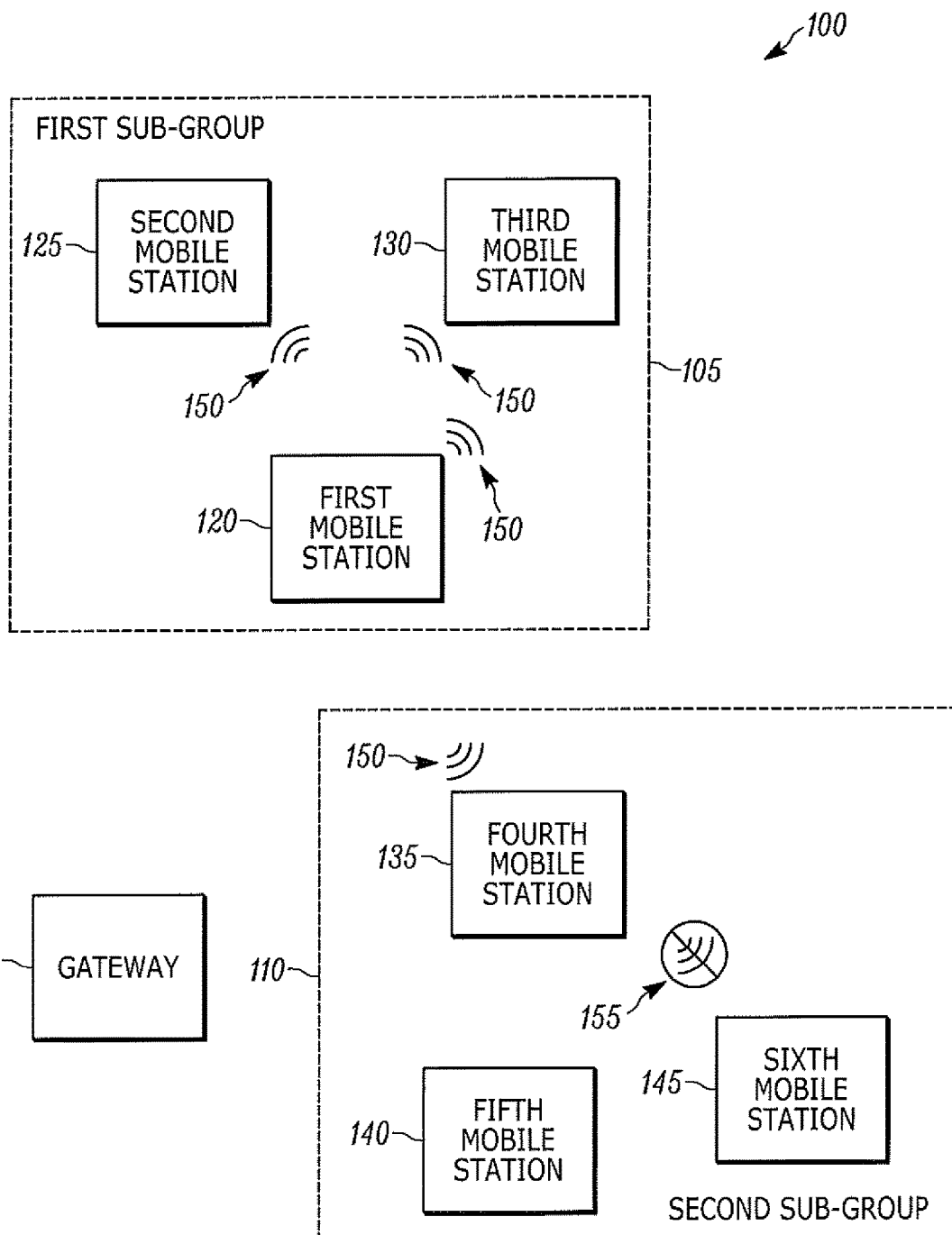
FIG. 1 illustrates a prior-art configuration of sub-groups of mobile stations in a mobile communication network.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Embodiments of the invention include systems and methods for sub-group communication in a direct mode of operation. In one embodiment, the invention is directed to a mobile station that communicates with other mobile stations within a mobile communication network. The mobile station includes, among other components, a radio unit, a push-to-talk key, and a controller. In some embodiments, the mobile station may also include a non-transient computer-readable memory. The radio unit receives and transmits communications. The push-to-talk key is selectively positioned in either an activated state or in a deactivated state. The controller is coupled to the radio unit and the push-to-talk key. The controller detects a request to transmit an outgoing communication and determines whether the push-to-talk key is in the activated state or in the deactivated state. The controller selects a first power level when a determined state of the push-to-talk key is the activated state and selects a second power level when the determined state of the push-to-talk key is the deactivated state. The controller transmits, via the radio unit, the outgoing communication on a current operating channel to at least one other mobile station within the mobile communication network at the selected power level.

In some embodiments, the controller of the mobile station performs as described using instructions stored on the non-transient computer readable memory that, when executed, cause the controller to perform all or a portion of the described operations or functions.

In another embodiment, the invention is directed to a method of operating a mobile station within a mobile communication network for sub-group communication in a direct mode of operation. The method includes detecting, via a controller, a request to transmit an outgoing communication and determining whether a push-to-talk key is in an activated state or in a deactivated state. The method further includes selecting, via the controller a first power level when a determined state of the push-to-talk key is the activated state, and selecting, via the controller, a second power level when the determined state of the push-to-talk key is the deactivated state. The method also includes transmitting, via a radio unit coupled to the controller, the outgoing communication on a current operating channel to at least one other mobile station within the mobile communication network at the selected power level.

FIG. 1 illustrates a mobile communication network 100 (such as TETRA, Project 25, Digital Mobile Radio, Public Safety Long Term Evolution, or other communication networks based on radio-frequency transmission). The mobile communication network 100 includes, for example, a first sub-group 105 of mobile stations, a second sub-group 110 of mobile stations, and a gateway 115. The first sub-group 105 includes, for example, a first mobile station 120, a second mobile station 125, and a third mobile station 130. The second sub-group 110 includes, for example, a fourth mobile station 135, a fifth mobile station 140, and a sixth mobile station 145. Each mobile station may be, for example, a type of TETRA mobile station.

The mobile stations communicate with each other on a single channel using a direct mode of operation. Generally speaking, a direction mode of operation refers to a mode of operation where mobile stations communicate directly with one another, independent of a larger communication network, and without sending communications through the gateway 115. The mobile stations may also communicate using a trunked mode of operation. Generally speaking, a trunked mode of operation refers to a mode of operation where mobile stations communicate with the larger communication network by sending communications through the gateway 115. The gateway 115 establishes communication between the direct mode of operation and the trunked mode of operation since the protocols used in the direct mode of operation and the trunked mode of operation are not compatible. The gateway 115 acts as a translator between the direct mode of operation and the trunked mode of operation, when a mobile station in the direct mode of operation wants to communicate with a mobile station in the larger communication network using the trunked mode of operation. The gateway 115 also acts as a translator between the trunked mode of operation and the direct mode of operation, when a mobile station in the larger communication network using the trunked mode of operation wants to communicate with a mobile station using the direct mode of operation. Generally speaking, a sub-group is a plurality of mobile stations that are located within a relative proximity of each other. The plurality of mobile stations in the sub-group may share a common operating channel.

In the example illustrated in FIG. 1, the first mobile station 120 transmits a voice communication or data 150, intended for the first sub-group 105 (i.e., the second mobile station 125 and the third mobile station 130). The fourth mobile station 135 is positioned close enough to the first mobile station 120 such that it receives the voice or data communication 150 from the first mobile station 120. The fourth mobile station 135 is only able to process one communication at a time. Therefore, the fourth mobile station 135 is unable to transmit its own voice communication 155 as long as it receives the voice communication 150 from the first mobile station 120. The fourth mobile station 135 is also unable to receive communications from the other mobile stations in the second sub-group 110 (i.e., the fifth mobile station 140 and the sixth mobile station 145). Despite the fact that the voice or data communication 150 transmitted by the first mobile station 120 is not intended for the second sub-group 110, it still prevents the fourth mobile station 135 from communicating within the second sub-group 110.

In some instances, as discussed above, it is possible for the second sub-group 110 to experience interference, in the sense that when the first sub-group 105 and the second sub-group 110 are communicating on the same channel, by default all mobile stations in the second sub-group 110 may receive communications from the first sub-group 105 despite the needs of the second sub-group 110. For example, when a user of the fourth mobile station 135 desires to transmit a voice communication 155 in a direct mode of operation for an immediate need (e.g., a fire-fighter requesting an axe from the other users in the second sub-group 110), the voice communication 155 to the second sub-group 110 may be blocked or otherwise interfered with by the voice communication 150 transmitted from the first mobile station 120.

Figure 2:
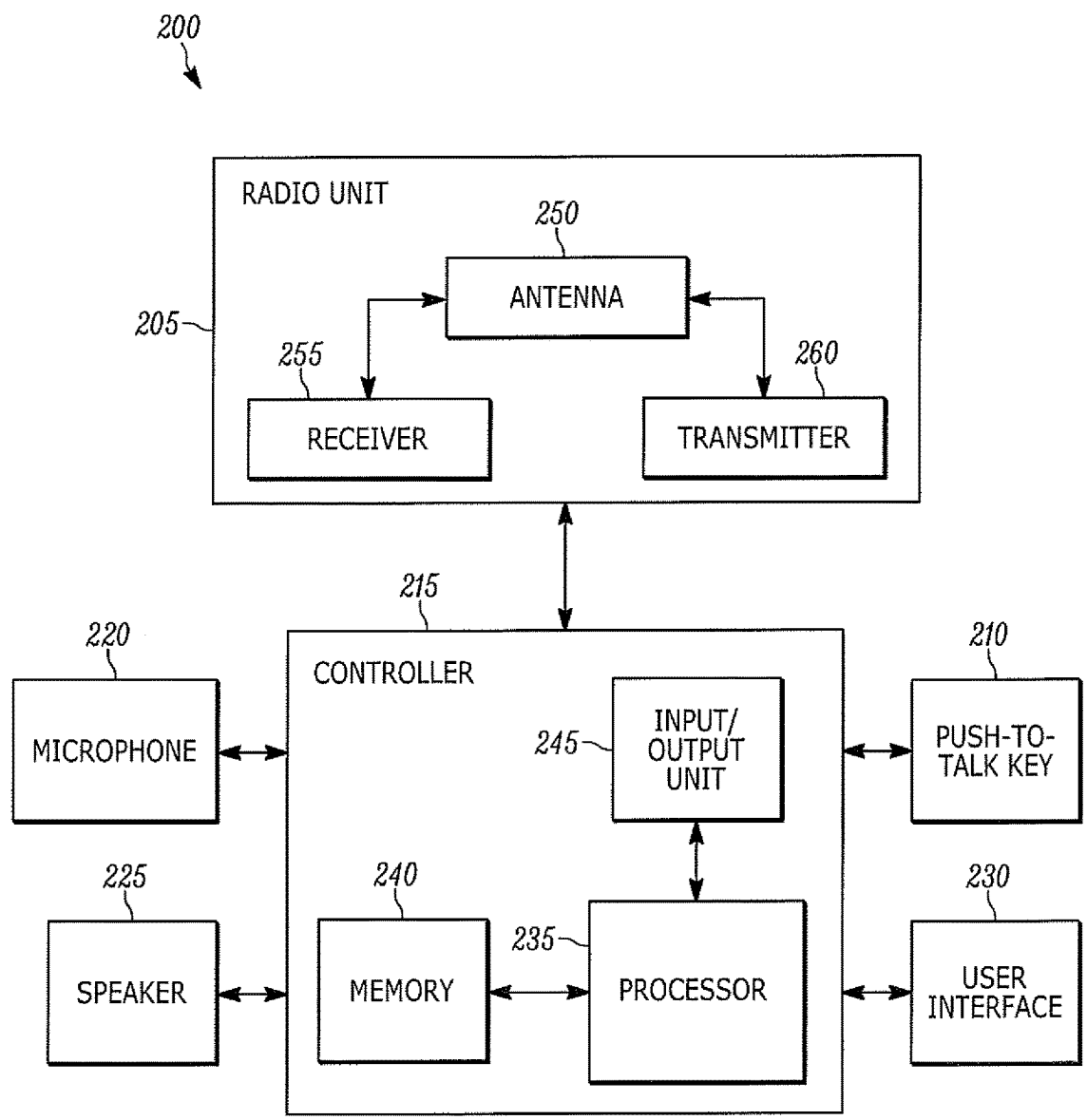
FIG. 2 illustrates a block diagram of a mobile station in accordance with some embodiments of the invention.

FIG. 2 illustrates a block diagram of a mobile station 200, in accordance with one embodiment of the invention. In the embodiment illustrated in FIG. 2, the mobile station 200 includes, among other components, a radio unit 205, a push-to-talk key 210, a controller 215, a microphone 220, a speaker 225, and a user interface 230. Although only a single radio unit 205 and a single controller 215 are illustrated in FIG. 2, in practice, the mobile station 200 may have more than one radio unit 205 and more than one controller 215, and at ratios other than one-to-one.

In one exemplary embodiment, the controller 215 includes, among other components, a processor 235, a memory 240, and an input/output unit 245. The memory 240 includes operational data for use by the processor 235 and program instructions for execution by the processor 235 enabling the controller 215 to control the radio unit 205 to communicate with other mobile stations. In some embodiments, the memory 240 includes a non-transient computer readable memory. Although a single processor 235 and a single memory 240 are illustrated, the controller 215 may include two or more processors 235 and two or more memories 240 to implement the functionality of the controller 215 described herein. The input/output unit 245 includes routines for transferring information and electric signals between components within the controller 215 and other components of the mobile station 200.

The radio unit 205 includes, among other components, an antenna 250, a receiver 255, and a transmitter 260. The receiver 255 and transmitter 260 may be separate units or part of a transceiver that both receives and transmits data. The antenna 250, receiver 255, and transmitter 260 enable the controller 215 to send and receive communication to and from other mobile stations via a direct mode of operation.

The push-to-talk key 210 is a switch, for example, a momentary switch, that operates in one of at least two states (e.g., an activated state and a deactivated state). When the push-to-talk key 210 is in the activated state, the mobile station 200 operates in a communication transmitting mode. When the push-to-talk key 210 is in the deactivated state, the mobile station 200 operates in a communication receiving mode.

The microphone 220 detects acoustic signals and outputs audio signals. The controller 215 converts the audio signals into outgoing communications which are transmitted via the radio unit 205. The controller 215 also converts incoming communications received via the radio unit 205 into audio signals, which are outputted from the speaker 225 as acoustic signals.

The user interface 230 is included to control the operation of the mobile station 200. The user interface 230 is operably coupled to the controller 215 to control, for example, the sub-group indicator 320 for the mobile station 200. The user interface 230 can include a combination of digital and analog input devices required to achieve a desired level of control for the mobile station 200. For example, the user interface 230 can include one or more of: a display (e.g., liquid-crystal-display screen, light-emitting diode screen, etc.), a touch-screen display, and a plurality of knobs, dials, switches, buttons, faders, or the like. In some embodiments, the user interface 230 is housed separately from other components of the mobile station 200. In some embodiments, the controller 215 uses the user interface 230 and/or the speaker 225 to indicate to a user whether an incoming communication is a network-wide communication or a sub-group communication. For example, the speaker 225 outputs a first type of beep for a network-wide communication and the second type of beep for a sub-group communication.

Figure 3:
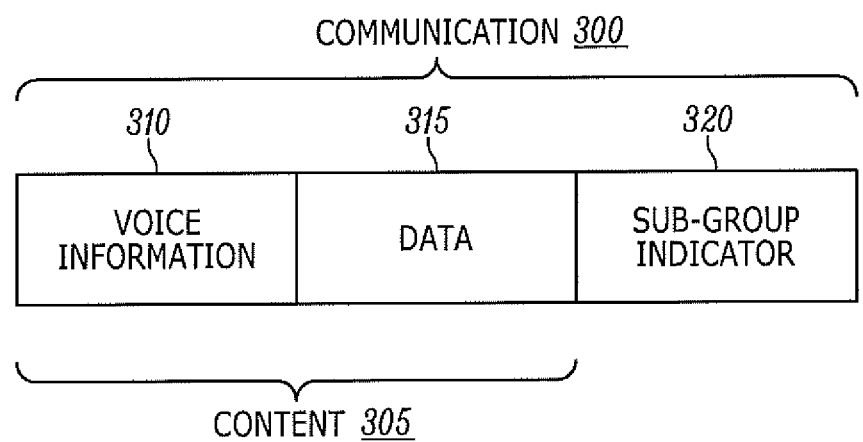
FIG. 3 illustrates a block diagram of a communication in accordance with some embodiments of the invention.

FIG. 3 illustrates a communication 300 according to some embodiments of the invention. In some embodiments, a communication 300 includes, among other components, content 305 having voice information 310 and data 315. Data 315 includes, for example, text messages. A communication 300 may be categorized as incoming or outgoing based on whether the communication 300 is being sent or received by a mobile station 200. In some embodiments, a communication 300 further includes a sub-group indicator 320. A sub-group indicator 320 is an indicator (e.g., a word, number, letter, symbol, etc.) that identifies a communication 300 as being a network-wide communication or a sub-group (e.g., local) communication. In some embodiments, a communication 300 includes, for example, a bit or a plurality of bits in a header section of a communication 300 which represent the sub-group indicator 320. A network-wide communication is a communication 300 that is intended for every mobile station 200 that is in transmission range of the sender. A sub-group communication is a communication 300 that is intended only for mobile stations that are within a determined transmission range of the sender.

Figure 4:
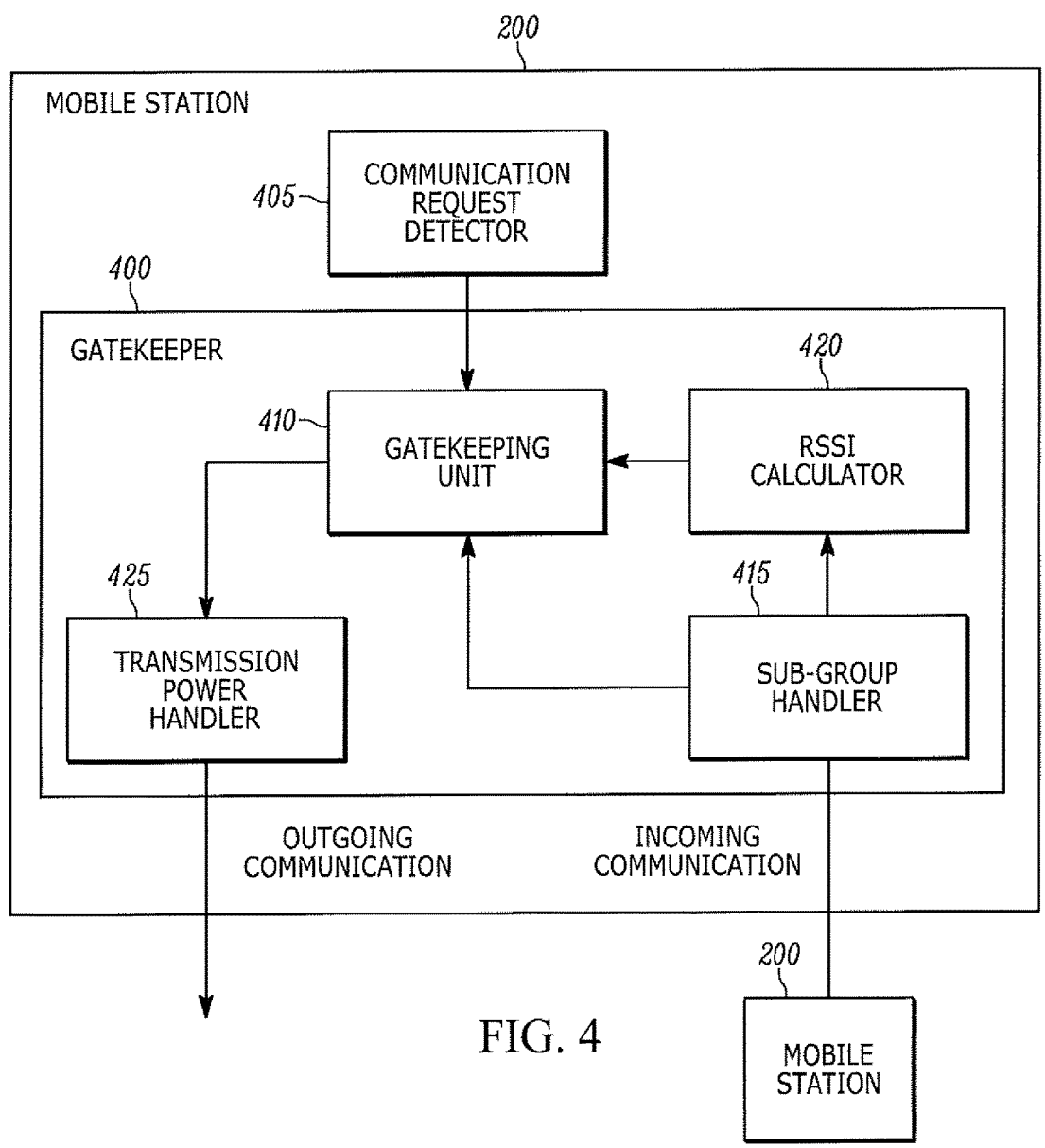
FIG. 4 illustrates a functional block diagram of a mobile station in accordance with some embodiments of the invention.

FIG. 4 is a functional block diagram of the mobile station 200. The controller 215, radio unit 205, and other components shown in FIG. 2 may be configured to implement the functions of the mobile station 200 described with respect to FIG. 4. The mobile station 200 includes, among other components, a gatekeeper 400 in communication with other mobile stations and a communication request detector 405. The gatekeeper 400 may be implemented in software or instructions stored in memory 240 and executed by the controller 215. In the illustrated embodiment, the gatekeeper 400 receives a request to transmit an outgoing communication from the communication request detector 405, processes transmission of the outgoing communication, and processes reception of an incoming communication received from another mobile station 200. The gatekeeper 400 includes, among other components, a gatekeeping unit 410, a sub-group handler 415, a received signal strength indicator (RSSI) calculator 420, and a transmission power handler 425.

The communication request detector 405 detects receipt of user input from a user to send an outgoing communication. In one embodiment, the communication request detector 405 detects user input from a user to send an outgoing communication via audio detection. In an example embodiment, the communication request detector 405 operates as a voice-operated switch. The communication request detector 405 sends a signal to the gatekeeping unit 410 indicating a request to transmit an outgoing communication when an acoustic input detected by the microphone 220 is above a certain threshold volume or decibel level (e.g., 70 decibels).

In another embodiment, the communication request detector 405 detects user input from a user to send an outgoing communication via motion detection. For example, the communication request detector 405 sends a signal to the gatekeeping unit 410 indicating a request to transmit an outgoing communication when it detects that the mobile station 200 is being shaken. In some embodiments, the communication request detector 405 detects a motion of the mobile station 200 using a type of motion sensor (e.g., accelerometer, gyroscope) included in the mobile station 200. The communication request detector 405 sends a signal to the gatekeeping unit 410 indicating a request to transmit an outgoing communication when the motion of the mobile station 200, detected by the motion sensor, is above a certain motion threshold value. In other embodiments, the communication request detector 405 sends a signal to the gatekeeping unit 410 indicating a request to transmit an outgoing communication, based on a trigger from a near field communication sensor.

The gatekeeping unit 410 determines whether the current operating channel of the mobile station 200 is busy. In some embodiments, the gatekeeper 400 only allows transmission of an outgoing communication when the current operating channel of the mobile station 200 is not busy (i.e., available). Therefore, upon receiving the signal from the communication request detector 405, the gatekeeping unit 410 sends a signal to the transmission power handler 425 indicating a request to transmit an outgoing communication only when the current operating channel of the mobile station 200 is available. The gatekeeping unit 410 determines that the current operating channel of the mobile station 200 is available when the mobile station 200 is not currently receiving an incoming communication. In some embodiments, the gatekeeping unit 410 determines that the current operating channel of the mobile station 200 is busy when the mobile station 200 is currently receiving an incoming communication. In some embodiments, the gatekeeping unit 410 determines that the current operating channel of the mobile station 200 is available when the mobile station 200 is currently receiving, but not accepting, an incoming communication.

In some embodiments, upon receiving the signal from the communication request detector 405, the gatekeeping unit 410 sends a signal to the transmission power handler 425 indicating a request to transmit an outgoing communication when the push-to-talk key 210 is in the deactivated state, regardless of whether the current operating channel of the mobile station 200 is available.

The sub-group handler 415 selects a sub-group indicator 320 for the mobile station 200 (e.g., a first sub-group indicator). In some embodiments, the sub-group handler 415 selects the first sub-group indicator from a plurality of sub-group indicators. In some embodiments, the sub-group handler 415 selects the first sub-group indicator based on user input received via the user interface 230. The sub-group handler 415 sends a periodic or continuous signal to the gatekeeping unit 410 indicating the currently selected first sub-group indicator.

The sub-group handler 415 also receives an incoming communication from another mobile station 200 and determines whether the incoming communication is a network-wide communication or a sub-group communication. In some embodiments, the incoming communication may include a sub-group indicator 320 (e.g., a second sub-group indicator). In some embodiments, the sub-group handler 415 identifies the incoming communication as a network-wide communication when the incoming communication does not include the second sub-group indicator. In some embodiments, the sub-group handler 415 determines whether to incoming communication is a network-wide communication or a sub-group communication based at least in part on the second sub-group indicator. For example, when the second sub-group indicator is equal to a first value (e.g., zero), the sub-group handler 415 identifies the incoming communication as a network-wide communication. Network-wide communications are intended for every mobile station 200 and are always accepted. Therefore, the sub-group handler 415 sends a signal to the gatekeeping unit 410 indicating that the incoming communication should be accepted when the incoming communication is identified as a network-wide communication. However, when the second sub-group indicator is not equal to the first value (e.g., the second sub-group indicator equals 1, 2, 3, etc.), the sub-group handler 415 identifies the incoming communication as a sub-group communication. Sub-group communications are not always accepted. Therefore, the sub-group handler 415 sends a signal to the received signal strength indicator (RSSI) calculator 420 indicating that an RSSI of the incoming communication should be tested. In some embodiments, the sub-group handler 415 also sends a periodic or continuous signal to the RSSI calculator 420 indicating the second sub-group indicator included in the incoming communication.

In some embodiments, the gatekeeper 400 does not include the sub-group handler 415. In such embodiments, the RSSI calculator 420 receives the incoming message and always tests the RSSI of the incoming message.

Upon receiving the signal(s) from the sub-group handler 415, the RSSI calculator 420 determines an RSSI of the incoming communication. RSSI is a measurement of the power present in a received signal (i.e., an incoming communication). The RSSI calculator 420 compares the RSSI of the incoming communication with a signal threshold value. The RSSI of the incoming communication is based at least in part on a distance that the incoming communication travels from a mobile station 200 that receives it to a mobile station 200 that sent it. For example, the farther the distance that the incoming communication needs to travel to reach the mobile station 200, the lower the RSSI of the incoming communication will be. The RSSI calculator 420 determines whether the incoming communication should be accepted or rejected based at least in part on the comparison of the RSSI of the incoming communication and the signal threshold value. For example, when the RSSI of the incoming communication is greater than or equal to the signal threshold value, the RSSI calculator 420 determines that the incoming communication is accepted. On the other hand, when the RSSI of the incoming communication is less than the signal threshold value, the RSSI calculator 420 determines that the incoming communication is rejected. The RSSI calculator 420 sends a signal to the gatekeeping unit 410 indicating whether the incoming communication should be accepted or rejected.

In some embodiments, the signal threshold value is a predetermined value. In some embodiments, RSSI calculator 420 determines the signal threshold value is based on user input received via the user interface 230. In some embodiments, RSSI calculator 420 determines the signal threshold value based on the second sub-group indicator included in the incoming message. As explained above, the incoming communication is identified as a sub-group communication when the second sub-group indicator is not equal to a first value. For example, the incoming communication is identified as a sub-group communication when the second sub-group indicator is equal to 1, 2, or 3. The RSSI calculator 420 sets the signal threshold value to a first level (e.g., −50 decibel-milliwatts (dBM)) when the second sub-group indicator is equal to 1. The RSSI calculator 420 sets the signal threshold value to a second level (e.g., −80 dBM) when the second sub-group indicator is equal to 2. The RSSI calculator 420 sets the signal threshold value to a third level (e.g., −110 dBM) when the second sub-group indicator is equal to 3. The first level is greater than the second level and the second level is greater than the third level.

It is to be understood that any references to a sub-group indicator 320 being a numerical value, included in this document, are only for purposes of explanation. These references do not limit the sub-group indicator 320 to only include a numerical value. As noted, the sub-group indicator 320 can include a variety of indicators, for example, words, numbers, letters, symbols, and the like.

Based on the signals received from the sub-group handler 415 and the RSSI calculator 420, the gatekeeping unit 410 determines whether the current operating channel of the mobile station 200 is busy or available. The gatekeeping unit 410 sends a signal to the transmission power handler 425 indicating a request to transmit an outgoing communication when the gatekeeping unit 410 receives a similar request from the communication request detector 405 and determines that the current operating channel of the mobile station 200 is available. In some embodiments, the gatekeeping unit 410 also sends a signal to the transmission power handler 425 indicating the first sub-group indicator.

The transmission power handler 425 determines whether the outgoing communication is a network-wide communication or a sub-group communication based on the current state of the push-to-talk key 210. In some embodiments, sub-group communications are transmitted at a lower power level than network-wide communications. A power level represents an amount of energy used to transmit a communication 300. The transmission power handler 425 selects a power level for transmission of the outgoing communication based on the current state of the push-to-talk key 210. As explained above, the push-to-talk key 210 exists in one of at least two states including an activated state and a deactivated state. In some embodiments, the transmission power handler 425 selects between a first power level and a second power level based on the current state of the push-to-talk key 210. The first power level is greater than the second power level. For example, the first power level may be approximately 1.8 watts (i.e., 32.55 decibel-milliwatts) and the second power level may be approximately 0.2 watts (i.e., 23.01 decibel-milliwatts). 1.8 watts is the standard maximum power level for a typical portable radio. The transmission power handler 425 identifies the outgoing communication as a network-wide communication when the push-to-talk key 210 is in the activated state. Therefore, the transmission power handler 425 selects the first power level when the push-to-talk key 210 is in the activated state. The transmission power handler 425 identifies the outgoing communication as a sub-group communication when the push-to-talk key 210 is in the deactivated state. Therefore, the transmission power handler 425 selects the second power level when the push-to-talk key 210 is in the deactivated state. In some embodiments, the transmission power handler 425 selects between more than two possible power levels. For example, the transmission power handler 425 can select a power level for a sub-group communication from a plurality of power levels. In some embodiments, the second power level is determined based on user input received via the user interface 230. In some embodiments, the first power level and the second power level are determined based on user input received via the user interface 230. After selecting a power level, the transmission power handler 425 transmits the outgoing communication at the selecting power level. In some embodiments, the outgoing communication includes the first sub-group indicator. In some embodiments, the outgoing communication includes the first sub-group indicator only when the outgoing communication is a sub-group communication (i.e., the push-to-talk key 210 is in the deactivated state).

Figure 5:
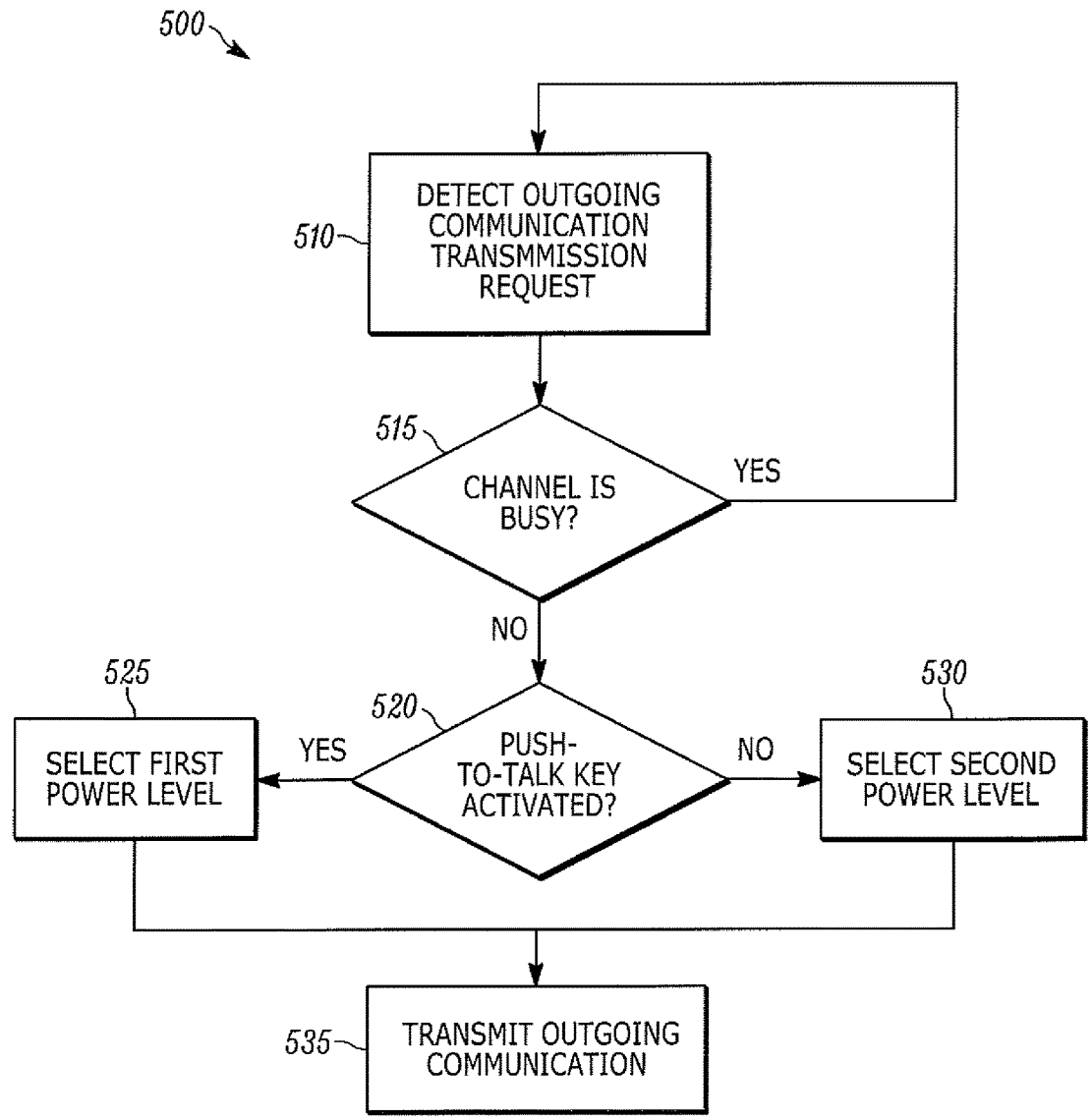
FIG. 5 is a flowchart of a communication transmission method, which may be carried out by a controller or similar device, for transmitting a communication within a mobile communication network in a direct mode of operation in accordance with some embodiments of the invention.

FIG. 5 illustrates a communication transmission method 500 (or process) for transmitting an outgoing communication within a mobile communication network in a direct mode of operation. In step 510, the gatekeeper 400 detects an outgoing communication transmission request from the communication request detector 405, e.g., using the gatekeeping unit 410. For instance, the gatekeeping unit 410 receives a signal from the communication request detector 405 indicating that an acoustic signal, captured by the microphone 220, is greater than or equal to a predetermined audio threshold.

In step 515, the gatekeeper 400 determines whether the current operating channel of the mobile station 200 is busy or not busy. In one embodiment, the gatekeeper 400 uses a first communication reception method 600 described below in FIG. 6. In another embodiment, the gatekeeper 400 uses a second communication reception method 700 described below in FIG. 7. The gatekeeper 400 waits for another outgoing communication request from the communication request detector 405 (i.e., returns to step 510) when it determines that the current operating channel of the mobile station 200 is busy. Alternatively, the gatekeeper 400 proceeds to step 520 when it determines that the current operating channel of the mobile station 200 is available.

In step 520, the gatekeeper 400 determines a current state of the push-to-talk key 210 (e.g., activated or deactivated), e.g., using the transmission power handler 425. When the push-to-talk key 210 is currently in the activated state, the transmission power handler 425 selects a first power level (step 525). The first power level indicates the power at which the outgoing communication will be transmitted by the gatekeeper 400, e.g., using the transmission power handler 425. When the push-to-talk key 210 is currently in the deactivated state, the transmission power handler 425 selects a second power level (step 530).

In step 535, the gatekeeper 400 transmits the outgoing communication at the selected power level, e.g., using the transmission power handler 425.

In some embodiments, the method 500 terminates after step 535 is complete. In other embodiments, the method 500 proceeds to step 510 to detect a new outgoing communication transmission request.

Figure 6:
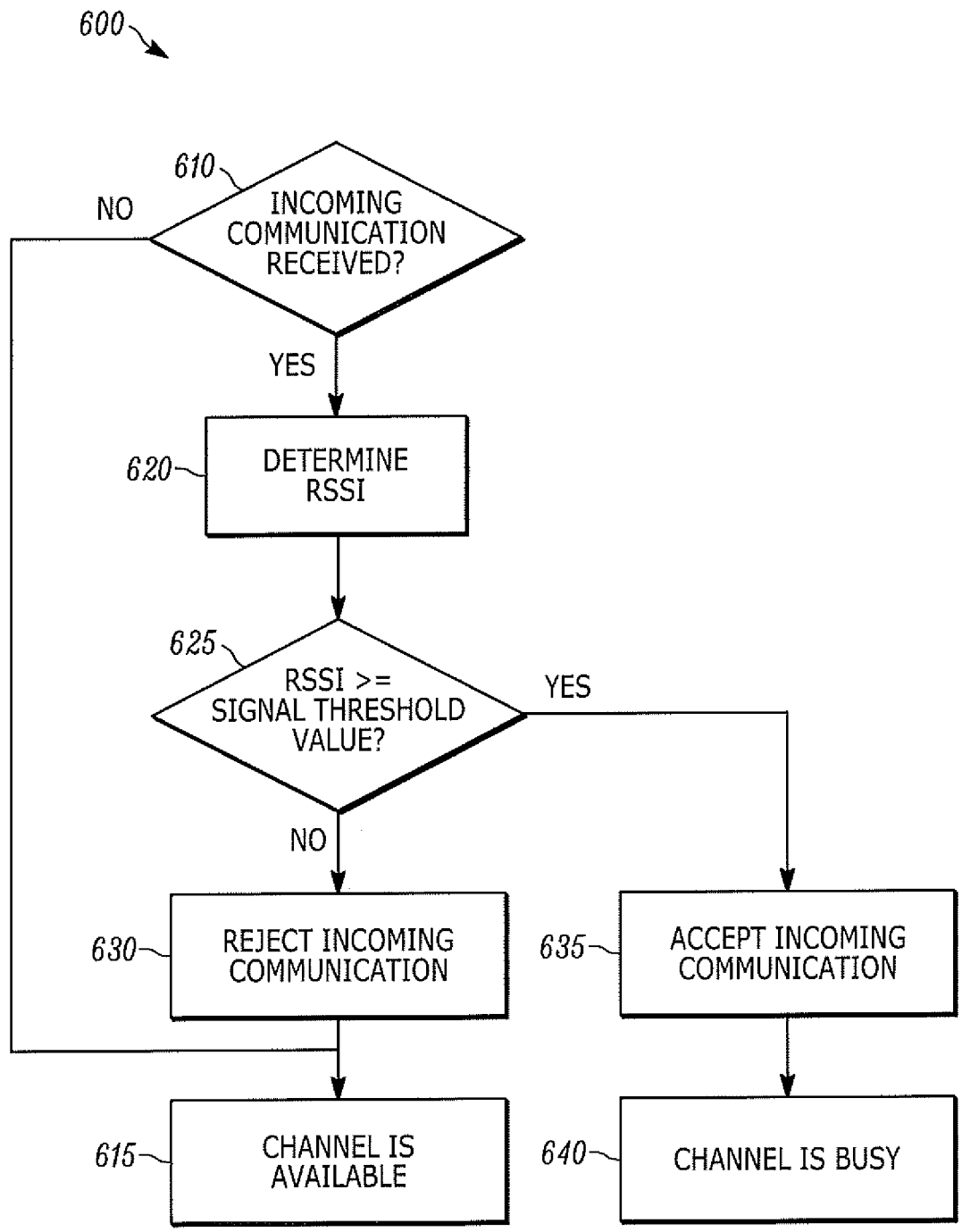
FIG. 6 is a flowchart of a communication reception method, which may be carried out by a controller or similar device, for receiving a communication within a mobile communication network in a direct mode of operation in accordance with some embodiments of the invention.

FIG. 6 illustrates a first communication reception method 600 (or process) for receiving an incoming communication within a mobile communication network in a direct mode of operation. In step 610, the gatekeeper 400 determines whether the mobile station 200 is receiving an incoming communication, e.g., using the RSSI calculator 420. When the gatekeeper 400 determines that the mobile station 200 is not receiving an incoming communication, the gatekeeper 400 identifies that the current operating channel of the mobile station 200 is available (step 615). On the other hand, when the gatekeeper 400 determines that the mobile station 200 is receiving an incoming communication, the gatekeeper 400 proceeds to step 620.

In step 620, the gatekeeper 400 determines an RSSI of the incoming communication, e.g., using the RSSI calculator 420. Next, the gatekeeper 400 compares the RSSI of the incoming communication to a signal threshold value, e.g., using the RSSI calculator 420 (step 625).

When the RSSI of the incoming communication is less than the signal threshold value, the gatekeeper 400 rejects the incoming communication (step 630) and identifies that the current operating channel of the mobile station 200 is available (step 615). On the other hand, when the RSSI of the incoming communication is greater than or equal to the signal threshold value, the gatekeeper 400 accepts the incoming communication (step 635) and identifies that the current operating channel of the mobile station 200 is busy (step 640). In some embodiments, accepting the incoming communication includes playing the incoming communication using the speaker 225.

In some embodiments, the method 600 terminates after step 615 or step 640 is complete. In other embodiments, the method 600 proceeds to step 610 to determine whether the mobile station 200 is receiving a new incoming communication.

Figure 7:
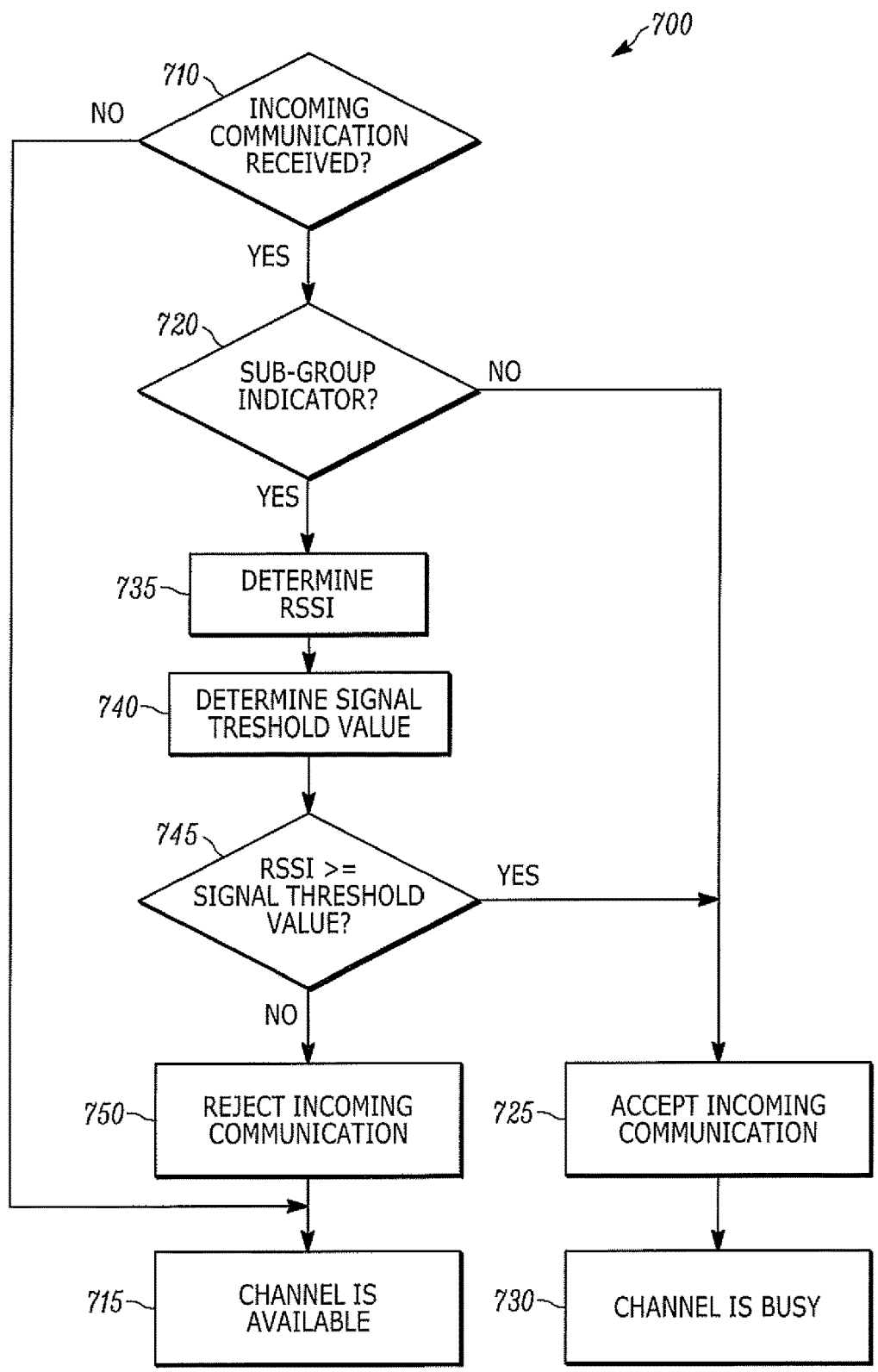
FIG. 7 is a flowchart of a communication reception method, which may be carried out by a controller or similar device, for receiving a communication within a mobile communication network in a direct mode of operation in accordance with some embodiments of the invention.

FIG. 7 illustrates a second communication reception method 700 (or process) for receiving an incoming communication within a mobile communication network in a direct mode of operation. In step 710, the gatekeeper 400 determines whether the mobile station 200 is receiving an incoming communication, e.g., using the sub-group handler 415. When the gatekeeper 400 determines that the mobile station 200 is not receiving an incoming communication, the gatekeeper 400 identifies that the current operating channel of the mobile station 200 is available (step 715). On the other hand, when the gatekeeper 400 determines that the mobile station 200 is receiving an incoming communication, the gatekeeper 400 proceeds to step 720.

In step 720, the gatekeeper 400 determines whether the incoming communication includes a sub-group indicator 320, e.g., using the sub-group handler 415. When the incoming communication does not include a sub-group indicator 320, or alternatively the incoming communication includes a sub-group indicator 320 that is equal to zero, the gatekeeper 400 accepts the incoming communication (step 725) and identifies that the current operating channel of the mobile station 200 is busy (step 730), e.g., using the gatekeeping unit 410. On the other hand, when the incoming communication includes a sub-group indicator 320 that is not equal to zero (e.g., 1, 2, 3, etc.), the gatekeeper 400 proceeds to step 735.

In step 735, the gatekeeper 400 determines an RSSI of the incoming communication, e.g., using the RSSI calculator 420. Next, the gatekeeper 400 determines a signal threshold value, e.g. using the RSSI calculator 420 (step 740). The signal threshold value is used to determine if the RSSI of the incoming communication is high enough to accept. In some embodiments, the signal threshold value is determined based at least in part on a numerical value that is stored in the memory 240. In other embodiments, the signal threshold value is determined based at least in part on user input received via the user interface 230. In some embodiments, the signal threshold value is determined based at least in part on the sub-group indicator 320 that is included in the incoming communication.

Next, the gatekeeper 400 compares the RSSI of the incoming communication to a signal threshold value, e.g., using the RSSI calculator 420 (step 745). When the RSSI of the incoming communication is less than the signal threshold value, the gatekeeper 400 rejects the incoming communication (step 750) and identifies that the current operating channel of the mobile station 200 is available (step 715). On the other hand, when the RSSI of the incoming communication is greater than or equal to the signal threshold value, the gatekeeper 400 accepts the incoming communication (step 725) and identifies that the current operating channel of the mobile station 200 is busy (step 730). In some embodiments, accepting the incoming communication includes playing the incoming communication using the speaker 225.

In some embodiments, the method 700 terminates after step 715 or step 730 is complete. In other embodiments, the method 700 proceeds to step 710 to determine whether the mobile station 200 is receiving a new incoming communication.

Figure 8:
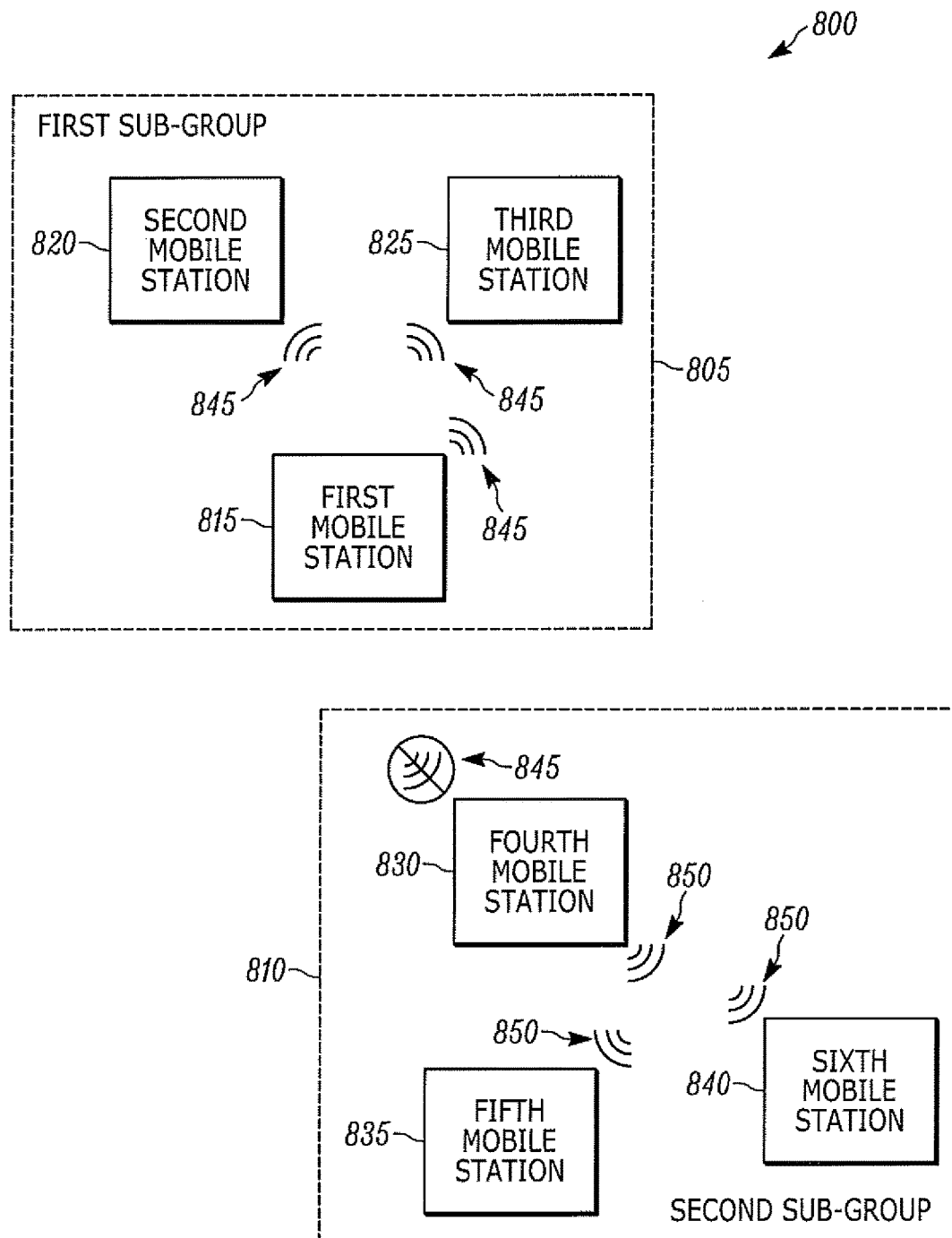
FIG. 8 illustrates an example mobile communication network in accordance with some embodiments of the invention.

FIG. 8 illustrates an example mobile communication network 800, in accordance with some embodiments of the invention. A first mobile station 815 transmits a first sub-group communication 845 at a lower power level, intended for other members of a first sub-group 805 (i.e., a second mobile station 820 and a third mobile station 825). A fourth mobile station 830, belonging to a second sub-group 810, is positioned close enough to the first mobile station 815 such that it receives the first sub-group communication 845 from the first mobile station 815. However, the RSSI of the first sub-group communication 845 received by the fourth mobile station 830 is relatively low because of the lower transmission power and greater distance that the first sub-group communication 845 has to travel. Therefore, the fourth mobile station 830 rejects the first sub-group communication 845 from the first mobile station 815. This allows the fourth mobile station 830 to transmit a second sub-group communication 850 to the second sub-group 810 (i.e., the fifth mobile station 835 and the sixth mobile station 840).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A mobile station that communicates with other mobile stations within a mobile communication network, the mobile station comprising:
   a radio unit that receives and transmits communications;
   a push-to-talk key selectively positionable in one selected from a group consisting of an activated state and a deactivated state; and
   a controller coupled to the radio unit and the push-to-talk key, the controller configured to
      detect a request to transmit an outgoing communication,
      determine whether the push-to-talk key is in the activated state or in the deactivated state,
      select a first power level when a determined state of the push-to-talk key is the activated state,
      select a second power level when the determined state of the push-to-talk key is the deactivated state, and
      transmit, via the radio unit, the outgoing communication on a current operating channel to at least one other mobile station within the mobile communication network at the selected power level.

2. The mobile station of claim 1, wherein the first power level is greater than the second power level.

3. The mobile station of claim 2, wherein the controller is further configured to receive, via the radio unit, an incoming communication on the current operating channel within the mobile communication network, determine a received signal strength indicator of the incoming communication, determine whether to accept or reject the incoming communication based at least in part on the received signal strength indicator, and determine whether the current operating channel is busy or available based at least in part on whether the incoming communication is accepted or rejected.

4. The mobile station of claim 3, wherein the incoming communication is accepted when the received signal strength indicator is greater than or equal to a signal threshold value, and wherein the incoming communication is rejected when the received signal strength indicator is less than the signal threshold value.

5. The mobile station of claim 2, wherein the outgoing communication includes a first sub-group indicator when the determined state of the push-to-talk key is the deactivated state.

6. The mobile station of claim 3, wherein the incoming communication includes a second sub-group indicator, and wherein the controller is further configured to determine whether to accept or reject the incoming communication based at least in part on the second sub-group indicator.

7. The mobile station of claim 6, wherein the incoming communication is accepted when the second sub-group indicator matches a first value, wherein the incoming communication is accepted when the second sub-group indicator does not match the first value and the received signal strength indicator is greater than or equal to a signal threshold value, and wherein the incoming communication is rejected when the second sub-group indicator does not match the first value and the received signal strength indicator is less than the signal threshold value.

8. The mobile station of claim 5, wherein the first sub-group indicator is selected from a plurality of sub-group indicators.

9. The mobile station of claim 7, wherein the controller is further configured to determine the signal threshold value based at least in part on the second sub-group indicator.

10. The mobile station of claim 8, further comprising a user interface coupled to the controller, wherein the controller is further configured to select the first sub-group indicator from the plurality of sub-group indicators based at least in part on a user input received from the user interface.

11. The mobile station of claim 7, further comprising a user interface coupled to the controller, wherein the controller is further configured to determine the signal threshold value based at least in part on a user input received from the user interface.

12. The mobile station of claim 2, further comprising a microphone that detects an acoustic signal and outputs an audio signal, the microphone coupled to the controller, wherein the controller is further configured to detect the request to transmit the outgoing communication based at least in part on the audio signal.

13. The mobile station of claim 2, further comprising a motion sensor that detects a motion of the mobile station and coupled to the controller, wherein the controller is further configured to detect the request to transmit the outgoing communication based at least in part on the motion of the mobile station.

14. A method of operating a mobile station within a mobile communication network, the method comprising:

detecting, via a controller, a request to transmit an outgoing communication;

determining, via the controller, whether a push-to-talk key is in an activated state or in a deactivated state;

selecting, via the controller, a first power level when a determined state of the push-to-talk key is the activated state;

selecting, via the controller, a second power level when the determined state of the push-to-talk key is the deactivated state; and transmitting, via a radio unit coupled to the controller, the outgoing communication on a current operating channel to at least one other mobile station within the mobile communication network at the selected power level.

15. The method of claim 14, wherein the first power level is greater than the second power level.

16. The method of claim 15, further comprising receiving, via the radio unit, an incoming communication on the current operating channel;

determining, via the controller, a received signal strength indicator of the incoming communication;

determining, via the controller, whether to accept or reject the incoming communication based at least in part on the received signal strength indicator; and determining, via the controller, whether the current operating channel is busy or available based at least in part on whether the incoming communication is accepted or rejected.

17. The method of claim 16, wherein the incoming communication is accepted when the received signal strength indicator is greater than or equal to a signal threshold value, and wherein the incoming communication is rejected when the received signal strength indicator is less than the signal threshold value.

18. The method of claim 15, wherein the outgoing communication includes a first sub-group indicator when the determined state of the push-to-talk key is the deactivated state.

19. The method of claim 16, wherein the incoming communication includes a second sub-group indicator, and wherein the method further comprises determining whether to accept or reject the incoming communication based at least in part on the received signal strength indicator and the second sub-group indicator.

20. The method of claim 19, wherein the incoming communication is accepted when the second-sub-group indicator matches a first value, wherein the incoming communication is accepted when the second sub-group indicator does not match the first value and the received signal strength indicator is greater than or equal to a signal threshold value, and wherein the incoming communication is rejected when the second sub-group indicator does not match the first value and the received signal strength indicator is less than the signal threshold value.

21. The method of claim 20, further comprising determining, via the controller, the signal threshold value based at least in part on the second sub-group indicator.

* * * * *